United States Patent [19]

Planting et al.

[11] 4,238,641

[45] Dec. 9, 1980

[54] COMPOSITE EPOXY GLASS-MICROSPHERE-DIELECTRICS FOR ELECTRONIC COAXIAL STRUCTURES

[75] Inventors: Peter J. Planting; Patricia A. Fritzen, both of Santa Rosa, Calif.

[73] Assignee: Bunker Ramo Corporation, Oak Brook, Ill.

[21] Appl. No.: 79,148

[22] Filed: Sep. 26, 1979

Related U.S. Application Data

[63] Continuation of Ser. No. 811,805, Jun. 30, 1977.

[51] Int. Cl.[3] .......... H01R 5/00; H02G 13/06

[52] U.S. Cl. .......... 174/88 C; 174/110 E; 260/37EP; 264/172; 428/36

[58] Field of Search .......... 252/63.2, 64; 174/116, 174/88 C, 110 E, 102 R; 264/DIG. 6, DIG. 54; 428/36

[56] References Cited

U.S. PATENT DOCUMENTS

| | | | |
|---|---|---|---|
| 2,997,527 | 8/1961 | Kessel et al. | 174/110 E X |
| 3,446,741 | 5/1969 | Hervig et al. | 252/64 |
| 3,573,976 | 4/1971 | Duane | 174/102 R |

OTHER PUBLICATIONS

Marsden, Polymer Eng. and Sci., pp. 97–112 (Apr., 1966).

Adam, Microwave Journal, pp. 50–54, Jul. 1976.

*Primary Examiner*—John D. Welsh

*Attorney, Agent, or Firm*—F. M. Arbuckle; B. W. Sufrin

[57] ABSTRACT

A composite epoxy/glass-microsphere-dielectric for hermetic R.F. connectors and coaxial cables is provided. A material which is a composition of moisture resistant epoxy resin, curing agent, glass microspheres, and silane coupling agent provide a low dielectric constant material to be molded into the various geometrics required for hermetic R.F. connectors and coaxial cables.

20 Claims, 4 Drawing Figures

COMPOSITE EPOXY GLASS-MICROSPHERE-DIELECTRICS FOR ELECTRONIC COAXIAL STRUCTURES

This is a continuation of application of application Ser. No. 811,805, filed June 30, 1977.

BACKGROUND OF THE INVENTION

Coaxial structures such as cables and hermetic R.F. connectors include inner and outer cylindrical conductors separated by a dielectric medium, typically of glass. It has been difficult to achieve optimum electrical performance of these devices because of lack of uniformity in the meniscus of the glass-to-metal seals which terminate the connectors, and also lack of parallelism of the glass end surfaces. Since glass has a relatively high dielectric constant ($\epsilon_r=5$), small physical variations can lead to large variations in electrical performance.

In the prior art it is known to utilize polymeric materials such as teflon or polyethylene as the dielectric material. However, large differences in the coefficient of thermal expansion between these polymers and the surrounding metal make it impossible to obtain a hermetic seal.

It would therefore be desirable to have a low dielectric constant material for use in coaxial structures, particularly in sub-miniature type-A (S.M.A) R.F. connectors so that design tolerances could be relaxed and R.F. performance and ease of manufacturability be increased. These improvements should be accomplished without sacrificing hermiticity or mechanical strength.

SUMMARY OF THE INVENTION

In accordance with the illustrated preferred embodiments, the present invention provides a dielectric material particularly useful as the dielectric in coaxial structures such as R.F. connectors. The material utilizes an epoxy base which can be easily molded into the connector to form a mechanically rigid hermetic seal between dielectric and inner and outer conductors comparable to glass-to-metal seals. The electrical and physical properties of the material are precisely varied and controlled by introducing a predetermined concentration of hollow glass microspheres into the epoxy. In preferred embodiments of the invention, silane coupling agents are also introduced to improve performance.

DETAILED DESCRIPTION OF THE INVENTION

Figure 1:
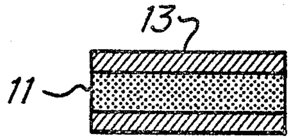
FIG. 1 shows an uncured epoxy dielectric composition injected into a hollow outer conductor.

Initially an epoxy base is prepared by mixing an appropriate epoxy resin with a suitable curing agent. Table I shows several suitable resins, identified by their tradenames, R-400 (from Abelstik Laboratories, Gardena, California) and Epon-825 (from Shell Chemical Co., New York, New York). The chemical formulations are also shown in Table I.

TABLE I

| COMMON NAME | (RESINS) CHEMICAL FORMULATION |
|---|---|
| R-400 | 50% Diglycidyl Ether of Bisphenol A<br>25% Epoxy Novolac<br>25% Vinyl Cyclohexene Dioside |
| EPON-825 | Diglycidyl Ether of Bisphenol A |

Suitable curing agents are listed in Table II, again by their tradenames and chemical formulations. EMI-24 is available from Okura Co., New York, New York, Shell D and Shell Z are both available from Shell Chemical Co., and NMA is manufactured by Union Carbide, New York, New York, while POPDA can be obtained from Jefferson Chemical Co., Houston, Texas.

TABLE II

| COMMON NAME | (CURING AGENTS) CHEMICAL FORMULATION |
|---|---|
| EMI-24 | 2-Ethyl-4-Methyl Imidazole |
| SHELL D | Trisdimethylamino ethylphenol -2 Ethylhexanoic Acid Salt |
| NMA | Nadic Methyl Anhydride |
| SHELL Z | Eutectic mixture of aromatic amines primarily Methylenedianiline and m-phenylenediamide |
| POPDA | Polyoxy Propylene Diamide |

The several resins listed in Table I may be combined with any of the curing agents of Table II in the weight ratios shown in Table III.

TABLE III

| RESIN Wt % | (Epoxy & Curing Agent Compositions by weight %, and curing schedules) CURING AGENT Wt % | CURE TIME AND TEMP: |
|---|---|---|
| R400 72.73 | POPDA 27.27 | 16 hours at 65° C., 2 hrs at 125° C. |
| R400 96.15 | EMI-24 3 85 | 16 hours at 65° C., 2 hrs at 125° C. |
| R400 90.91 | Shell D 9.09 | 16 hours at 65° C., 2 hrs at 125° C. |
| Epon-825 75.76 | POPDA 24.24 | 16 hours at 65° C., 2 hrs at 125° C. |
| Epon-825 96.15 | EMI-24 3.85 | 16 hours at 65° C., 2 hrs at 125° C. |
| Epon-825 90.91 | Shell D 9.09 | 16 hours at 65° C., 2 hrs at 125° C. |
| R400 80.97 | Shell Z 19.03 | 16 hours at 65° C., 10 hrs. at 125° C. |
| R400 48.54 | NMA 50.97 EMI-24 0.49 | 16 hours at 65° C., 10 hrs. at 125° C. |
| Epon-825 83.33 16.67 | Shell Z at 125° C. | 16 hours at 65° C., 10 hrs. |
| Epon-825 52.36 | NMA 47.12 EMI-24 0.52 | 16 hours at 65° C., 10 hrs. at 125° C. |

A silane coupling agent such as those listed in Table IV (all available from Dow Corning Chemical Products Division, Midland, Michigan) is incorporated into the mixture in the range of 0.50% to 1.00% by weight.

TABLE IV (SILANE COUPLING AGENTS)

| COMMON NAME | CHEMICAL FORMULATION |
|---|---|
| Dow Corning Z-6040 | γ-glycidoxypropyltrimethoxysilane |
| Dow Corning Z-6075 | vinyltriacetoxysilane |
| Dow Corning Z-6020 | 3-(2-aminoethylamino) propyltrimethoxysilane |

At this point there is incorporated into the epoxy-silane matrix a desired density of glass microspheres. Glass microspheres are thin-walled (1-2 μm) hollow air-filled spheres, typically with a particle size between 10 and 300 μm. They are available, for example, from 3M Company, Saint Paul, Minnesota or Emerson & Cuming Inc., Canton, Massachusetts, and are typically fabricated of materials such as sodium borosilicate, silica, or alumina silicate. For applications in R.F. connectors, low alkaline sodium borosilicate microspheres are preferred. The size of the microspheres may be selected to produce any desired amount of electrical phase shift at the connector interface. To produce less then 2° phase shift at about 25 GHz it has been found that glass microspheres in the size range 10 μm-63 μm are preferred. These are introduced into the epoxy-silane matrix in a ratio of about 38% by weight, with a range of between 33 wt% and 40 wt% producing acceptable results.

Figure 2:
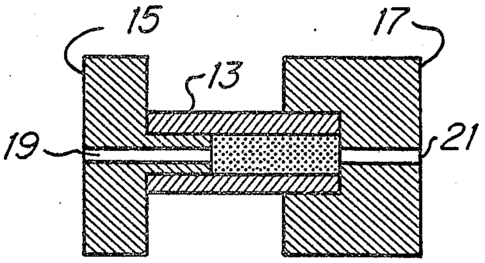
FIG. 2 shows a pair of caps with guiding central slots for the center conductor.
Figure 3:
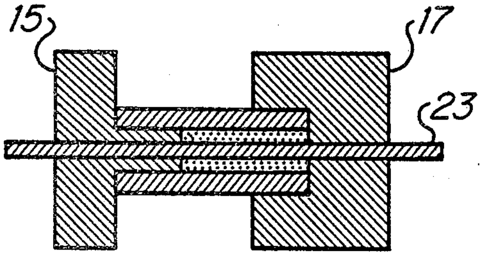
FIG. 3 shows an inner conductor positioned centrally by the caps and forced through the uncured epoxy dielectric.

When the above-described composition has been thoroughly mixed, excess air is removed and the dielectric material inserted into a hollow metallic conductor. For example, in FIG. 1 a dielectric material 11 is inserted into a hollow metallic conductor 13. In FIG. 2, a pair of caps 15 and 17 including hollow central portions 19 and 21 are snapped onto the outside of conductor 13 to position a central conductor. FIG. 3 shows a solid center conductor 23 having been inserted through slots 19 and 21 in caps 15 and 17 and pushed through the uncured dielectric medium 11.

Figure 4:
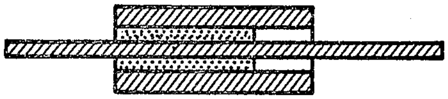
FIG. 4 shows an R.F. connector configuration.

At this point the connector is placed in an oven to cure the epoxy under a pressure of 60-80 psig. Curing times and temperatures appropriate for each of the illustrative resin curing-agent combinations are shown in Table III. After curing, caps 15 and 17 are removed leaving a basic connector configuration shown in FIG. 4.

Of the various combinations of materials fabricated and tested, the preferred embodiment consists of an R-400/EMI-24/silane/microsphere composite. The weight ratio of R-400 to EMI-24 is fixed by stoichiometry at 96.15/3.85. The ratio of silane to the R-400, EMI-24 mixture should be in the range 0.9/99.1 to 1.1/98.9, with a preferred ratio of 1.0/99.0. Finally, the weight ratio of glass-microspheres to the R-400, EMI-24, silane mixture should be in the range 33/67 to 40/60, with a preferred ratio of 38/62.

In addition to a desirable low dielectric constant, the preferred composite was found to exhibit a coefficient of thermal expansion very close to that of metal conductors such as aluminium or beryllium-copper typically used in R.F. connectors. This property makes it possible to obtain a simple hermetic seal at the conductor-dielectric interfaces. Some electrical and physical properties of this preferred composite are tabulated in Table V.

TABLE V (PROPERTIES OF SMA TYPE R.F. CONNECTORS WITH EPOXY GLASS-MICROSPHERE COMPOSITE)

| ELECTRICAL AND PHYSICAL PROPERTIES | R-400/EMI-24/SILANE MICROSPHERE DIELECTRIC |
|---|---|
| Dielectric constant | 2.06 ± 2% |
| Insertion loss | Varies with humidity. |
| 15 GHz | 0.70 to 0.96 dB/inch |
| 18 GHz | 0.80 to 1.16 dB/inch |
| 26.5 GHz | 1.06 to 1.60 dB/inch |
| Coefficient of thermal expansion α −50 to 25° C. | $25 \pm 5 \times 10^{-6}$ cm/cm/°C. |
| Hermeticity | Leak rate $10^{-7}$ to $10^{-8}$ cc He/sec. with dielectric length ≧0.100". |
| Dielectric fabrication methods | Uncured dielectric injectable into connector barrel. Cured dielectric is machinable. |

I claim:

1. A structure for conveying electrical signals manufactured by performing the steps comprising:

preparing a dielectric material by combining an epoxy resin, an epoxy resin curing agent, a silane coupling agent and a plurality of glass-microspheres;

forming an interim structure including a hollow outer electrical conductor containing disposed therein said dielectric material and at least one inner electrical conductor; and curing said dielectric material to produce said structure for conveying electrical signals.

2. A structure as in claim 1 wherein said epoxy resin is

50% Diglycidyl Ether of Bisphenol A

25% Epoxy Novolac

25% Vinyl Cyclohexene Dioxide; and said epoxy curing agent is

2-Ethyl-4-Methyl Imidazole.

3. A structure as in claim 1 wherein said silane coupling agent is 3-(2-aminoethylamino) propyltrimethoxysilane.

4. A structure as in claim 1 wherein said glass-microspheres are of treated sodium borosilicate to give low surface alkalinity.

5. A structure as in claim 4 wherein the size of said glass-microspheres is in the range 10 mμ to 63 mμ.

6. A structure as in claim 5, wherein the glass-microspheres are present in a weight ratio to the mixture of the epoxy, the curing agent and the silane of from 33 to 40 weight percent.

7. A structure as in claim 1 wherein said epoxy resin and said curing agent are present in a weight ratio of 96.153/3.85.

8. A structure as in claim 1 wherein the weight ratio of said silane coupling agent to the mixture of epoxy resin and curing agent is in the range 1.1/100 to 0.9/100.

9. A structure as in claim 1 wherein the weight ratio of silane to epoxy resin and curing agent is 1.00/99.0.

10. A structure as in claim 1 wherein the weight ratio of glass-microspheres to the mixture of epoxy resin, curing agent and silane is in the range 33/67 to 40/60.

11. A structure as in claim 1 wherein the weight ratio of microspheres to epoxy resin and curing agent is 38.0/62.0.

12. A method for manufacturing a coaxial structure comprising:

mixing an epoxy resin with a curing agent to produce an epoxy resin base;

mixing a silane coupling agent into said epoxy base to produce an epoxy-silane matrix;

mixing a plurality of glass-microspheres into said epoxy-silane matrix to produce a dielectric material;

inserting said dielectric material into a hollow outer conductor;

positioning an inner conductor in said dielectric material, said inner conductor being centrally disposed with respect to said outer conductor; and curing said dielectric material to produce said coaxial structure.

13. The method of claim 12 wherein the glass-microspheres are mixed into the epoxy base prior to adding the silane coupling agent.

14. The method of claim 12 wherein the inner conductor is positioned in the hollow outer metal conductor prior to inserting the dielectric material into said hollow outer conductor.

15. A structure as in claim 1 wherein an interim structure includes a hollow outer electrical conductor containing coaxially disposed therein a single inner electrical conductor.

16. A structure as in claim 1 wherein said dielectric material has a dielectric constant of about 2.06±2%.

17. A structure as in claim 1 wherein said dielectric material has a coefficient of thermal expansion over the range of −50° to 25° C. of about $25\pm5\times10^{-6}$cm/cm/°C.

18. A structure as in claim 1 wherein said structure is a radio frequency connector.

19. A structure as in claim 18 wherein said radio frequency connector has an insertion loss over the range of 15–26.5 GHz of from 0.70 to 1.60 dB inch.

20. A structure as in claim 18 wherein said radio frequency connector has a dielectric length greater than or equal to 0.100 inches and said connector has a leak rate of $10^{-7}$ to $10^{-8}$ cc of He/second.

* * * * *